United States Patent [19]

Collier

[11] Patent Number: 4,610,453
[45] Date of Patent: Sep. 9, 1986

[54] WIRE FORM SUPPORT SYSTEM FOR FUEL TANKS

[75] Inventor: John D. Collier, Brantford, Canada

[73] Assignee: Tamco Limited, Windsor, Canada

[21] Appl. No.: 690,475

[22] Filed: Jan. 10, 1985

[30] Foreign Application Priority Data

Jun. 28, 1984 [CA] Canada .................................. 457667

[51] Int. Cl.$^4$ ............................................. B60K 15/02
[52] U.S. Cl. ................... 280/5 A; 180/68.5;
206/583; 220/1 V; 224/42.43; 248/313
[58] Field of Search ............ 280/5 A, 5 R, 5 D, 5 H;
180/68.5; 206/583, 591; 220/1 V, DIG. 24;
224/42.43, 42.45 R; 248/313, 324, 503

[56] References Cited

U.S. PATENT DOCUMENTS

| | | | |
|---|---|---|---|
| 2,065,268 | 12/1936 | Crary | 280/5 D |
| 2,090,059 | 8/1937 | McClane | 248/580 |
| 2,410,182 | 10/1946 | Prior | 280/5 R |
| 2,861,766 | 11/1958 | Legman | 248/313 A |
| 2,902,240 | 9/1959 | Belle | 248/201 |
| 4,013,300 | 3/1977 | Berger | 280/5 A |

FOREIGN PATENT DOCUMENTS 2325248 12/1974 Fed. Rep. of Germany ... 224/44.25 R

OTHER PUBLICATIONS

SAE Technical Paper Series, pp. 123–128, Gordon D. Millar & John D. Collier, Society of Automotive Engineers, "Wire Skeletonizing: Principles and Potential for Automotive", 1983.

Primary Examiner—John J. Love
Assistant Examiner—Mitchell J. Hill
Attorney, Agent, or Firm—David A. Burge

[57] ABSTRACT

A fuel tank support for vehicles such as trucks consists of a bracket formed of wire which is detachably connected to a frame of a vehicle, the bracket conforming generally in contour to approximately half of the transverse cross sectional contour of the fuel tank. The bracket has spaced wire members with loops at each end, a strap member being pivotally connected to one loop and detachably connected to the other loop to complete the overall support of the transverse cross sectional conture of the tank. Wire reinforcing members extend angularly across the spaced wire members and are connected thereto.

2 Claims, 3 Drawing Figures

WIRE FORM SUPPORT SYSTEM FOR FUEL TANKS

This invention relates to fuel tank supports for a large vehicle such as trucks and in particular to fuel tanks which are mounted externally of the vehicle frame.

Large vehicles such as dump trucks, mobile concrete mixers and the like have their fuel tanks mounted externally of the frame rather than being located within the confines of the frame as in a passenger car. These fuel tanks are usually quite large running anywhere from 25 to 50 gallons or more in size. Conventionally, the devices for supporting these large tanks consist of L-shape or semi-circular saddles or saddle-type brackets formed from heavily fabricated sheet steel members or a stamped steel members of U-shaped cross section. While most supports perform adequately, they are very heavy and expensive to manufacture.

The fuel tank support according to the invention is, on the other hand, much less expensive to manufacture and is substantially lighter than conventional supports without giving away anything in the form of strength. According to a broad aspect, the invention relates to a wire form fuel tank support for vehicles such as trucks and the like and comprising a wire form bracket that conforms generally in contour to approximately half of the transverse cross sectional contour of a tank to be supported. The bracket has spaced wire members terminating in end loops with wire reinforcing members interconnecting and extending angularly across the spaced wire members. The reinforcing members are spaced substantially throughout the length of the spaced wire members and a strap member is pivotally connected at one end to one of the wire member loops and is adapted to extend over substantially the remaining transverse cross section contour of the tank, the fastening assembly at the other end of the strap being provided for detachable connection of the strap to the other loop end of the wire member. A suitable means are provided for fastening a portion of the wire form bracket to the vehicle frame.

The invention is illustrated by way of example in the accompanying drawings in which.

Figure 1:
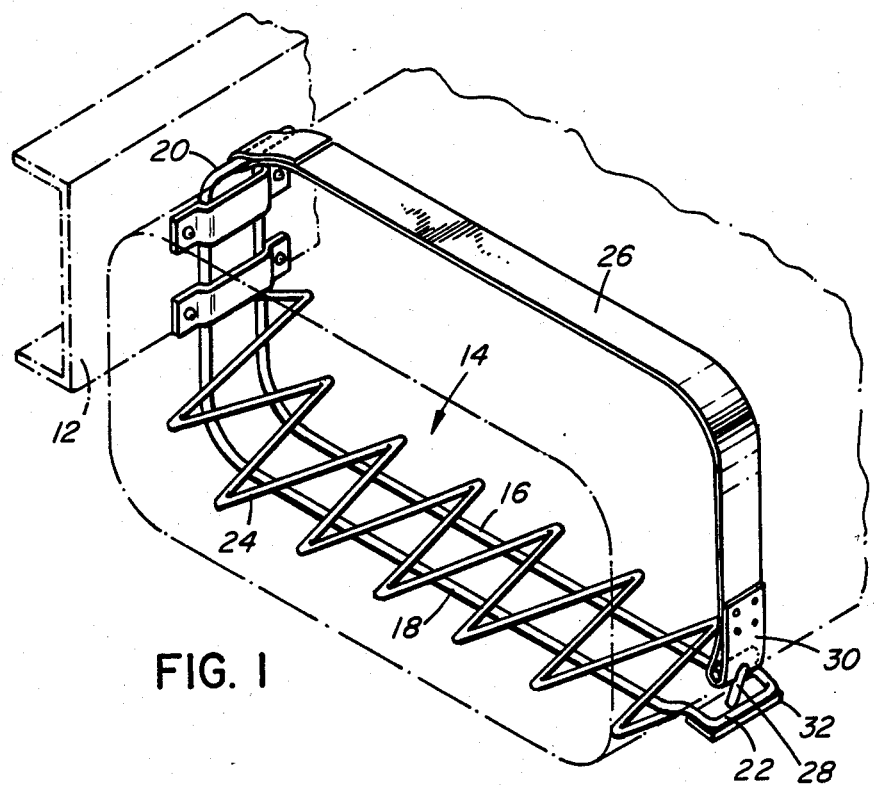
FIG. 1 is a perspective view of a wire form fuel tank support according to the invention.

Referring to FIG. 1, a vehicle fuel tank 10 is shown in phantom line and is generally of rectangular cross section although it will be appreciated that such tanks can be square or round in cross section. The tank is mounted to the exterior of a frame rail 12 of a vehicle, not shown, by a support bracket 14 formed of wire. It will be noted that only a portion of the fuel tank 10 is illustrated. Smaller capacity tanks could be adequately supported with one bracket 14 but, if the tank is larger it would be preferable to use at least two brackets.

The bracket 14 conforms generally in contour to approximately half of the transverse cross sectional contour of the tank 10 and accordingly, in the illustrated embodiment the bracket 14 is of generally L-shape with the small leg of the L being secured to the frame rail 12 and the long leg of the L supporting the tank 10.

The fuel tank support bracket 14 consists of a pair of spaced wire members 16, 18 having end loops 20 and 22 as illustrated. The spacing of the wire members 16,18 would depend on the amount of support to be given to a specific tank. As an example, the size of the wire members 16,18 would be three-eighths of an inch diameter and the spacing between the members would be approximately four inches.

In addition to the wire members 16,18, reinforcing members 24 are provided throughout substantially the length of the L-shaped bracket 14, the length of the reinforcing members 24 being such as to extend substantially beyond the width of the bracket 14 and its wire member 16,18. While the reinforcing members 24 could be individual wire members it is preferred that a single wire member being bent into either a zig-zag configuration as shown or a continuous coil configuration, be used. The zig-zag formation is inexpensive to fabricate and it has inherent strength in the interconnection of each member. The members overlay and are welded to the wire member 16,18 of the bracket. As an example, the reinforcing members 24 would be formulated from quarter inch diameter steel wire.

Figure 3:
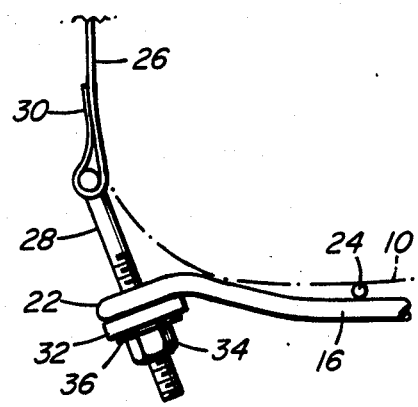
FIG. 3 is a fragmentary elevation view of the strap fastening assembly.

In order to complete the support of the full transverse cross sectional contour of the tank 10, and in order to easily mount and demount a tank 10 from the support bracket 14, a strap member 26 is pivotally connected at one end to the bracket loop 20 and at the other end is provided with means for detachable securement to the loop 22 of the long leg of the bracket 14. In the embodiment illustrated, this connection consists of a T-bolt 28 pivotally secured in the end 30 of the strap 26 and passing through a plate 32 welded to the loop 22. A suitable nut 34 and washer 36 complete the attachment as shown in FIG. 3.

Figure 2:
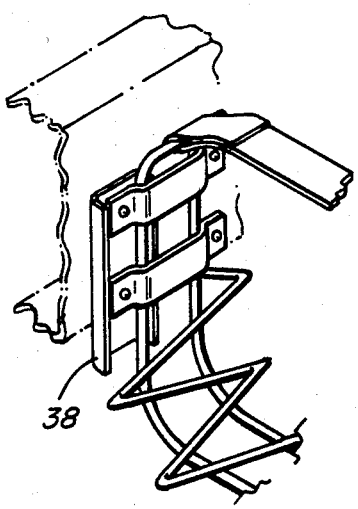
FIG. 2 is a fragmentary perspective view of the support showing a modification therein.

The short leg or vertically oriented leg of the bracket 14 is fastened to the frame rail 12 by means of steel straps such as quarter inch steel of approximately one and a half to two inch width that extends over the wire members 16,18 and is welded or preferably bolted into the frame rail 12. As shown in FIG. 2, this connection can be reinforced through the provision of an additional bracing member in the form of a shallow U-shaped channel of approximately one-eighth inch thickness which is located between the brackets and the frame rail and beneath each wire 16,18, only one such reinforcing member 38 being shown.

Tests have shown that a wire formed fuel tank support according to the invention meets all the requirements for strength designated for such supports and does so at a substantial saving in manufacturing costs and in weight.

Those skilled in the art will appreciate that various features, characteristics and advantages of the present invention have been set forth herein or are readily realizable from the detailed description of this preferred embodiment. However, this disclosure is illustrative and various changes may be made while utilizing the principal of the present invention and falling within the scope of the invention as expressed in the appended claims.

The embodiments of the invention in which an exclusive property or privilege is claimed are defined as follows:

1. A wire form fuel tank support for vehicles comprising a wire form bracket conforming generally in contour to approximately half of the transverse cross sectional contour of a tank to be supported, said bracket having spaced wire members terminating in end loops, load spreading means comprising wire reinforcing members interconnecting and extending angularly across said spaced wire members, said reinforcing members being spaced substantially throughout the length of said spaced wire members; a strap member pivotally connected at one end to one of said wire member loops, said strap being adapted to extend over substantially the remaining transverse cross sectional contour of said tank, a fastening assembly at the other end of said strap for detachable connection to the other loop end of the wire members; and means for fastening a portion of said wire form bracket to a vehicle frame.

2. A fuel tank support according to claim 1 wherein said wire reinforcing members comprise a zig-zag formation of wire, the length of each member of the zig-zag formation extending substantially beyond the width of said wire form bracket.

* * * * *